ced by examiner

(12) United States Patent
Brown

(10) Patent No.: US 8,633,729 B1
(45) Date of Patent: Jan. 21, 2014

(54) LOCALIZED PLASMON-POLARITON (LPP) LOGIC GATES AND COMPUTING

(75) Inventor: Robert G. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 68 days.

(21) Appl. No.: 13/360,575

(22) Filed: Jan. 27, 2012

(51) Int. Cl.
*H03K 19/195* (2006.01)
(52) U.S. Cl.
USPC .................................................. 326/6; 326/7
(58) Field of Classification Search
None
See application file for complete search history.

(56) References Cited

U.S. PATENT DOCUMENTS

2007/0292076 A1* 12/2007 Hyde et al. ...................... 385/16

* cited by examiner

*Primary Examiner* — Jany Richardson
(74) *Attorney, Agent, or Firm* — Donna P. Suchy; Daniel M. Barbieri

(57) ABSTRACT

A computing structure is described. The computing structure includes at least one logic gate. The at least one logic gate has an arrangement of nano-particles configured to propagate localized plasmon-polaritons (LLPs). The logic gate may have a gate state and be configured to perform a logic function based on a desired logical output.

36 Claims, 11 Drawing Sheets

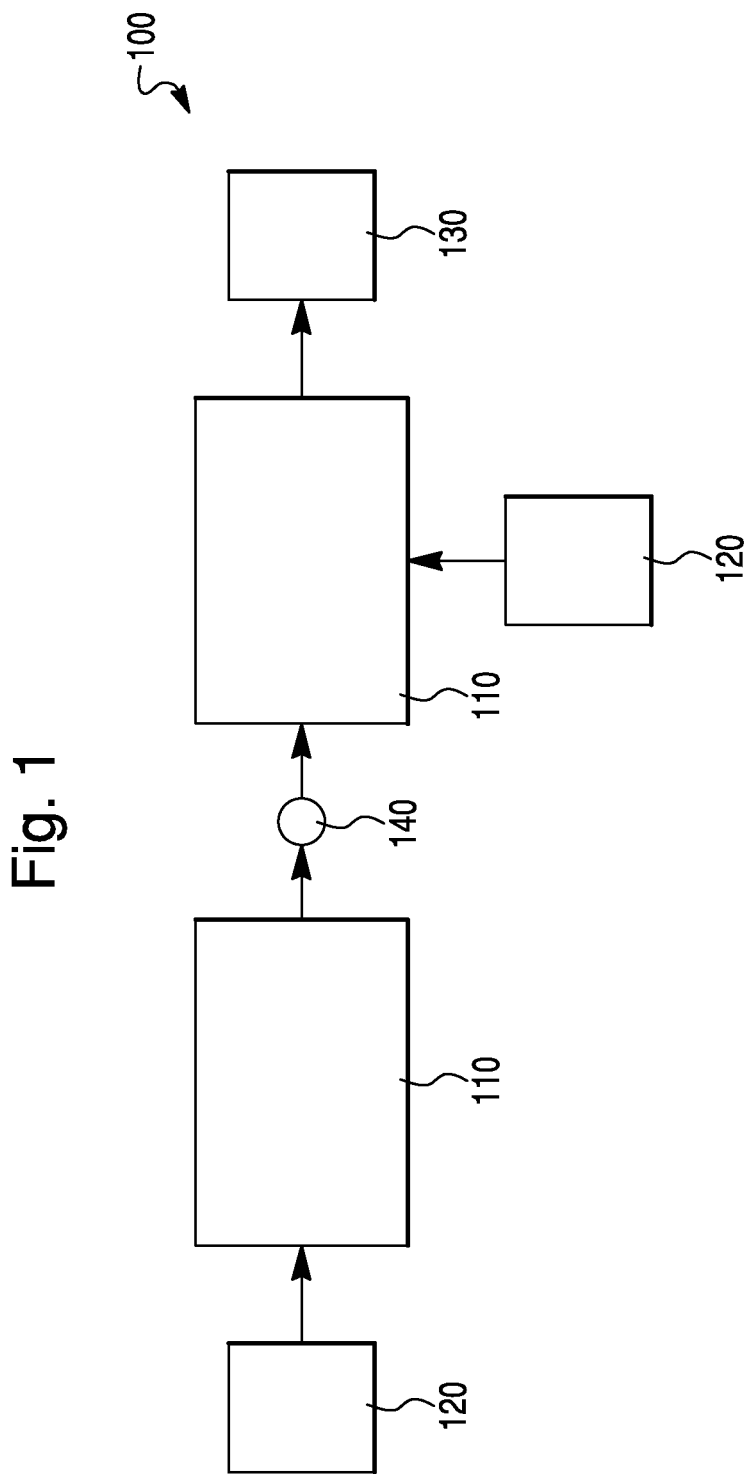

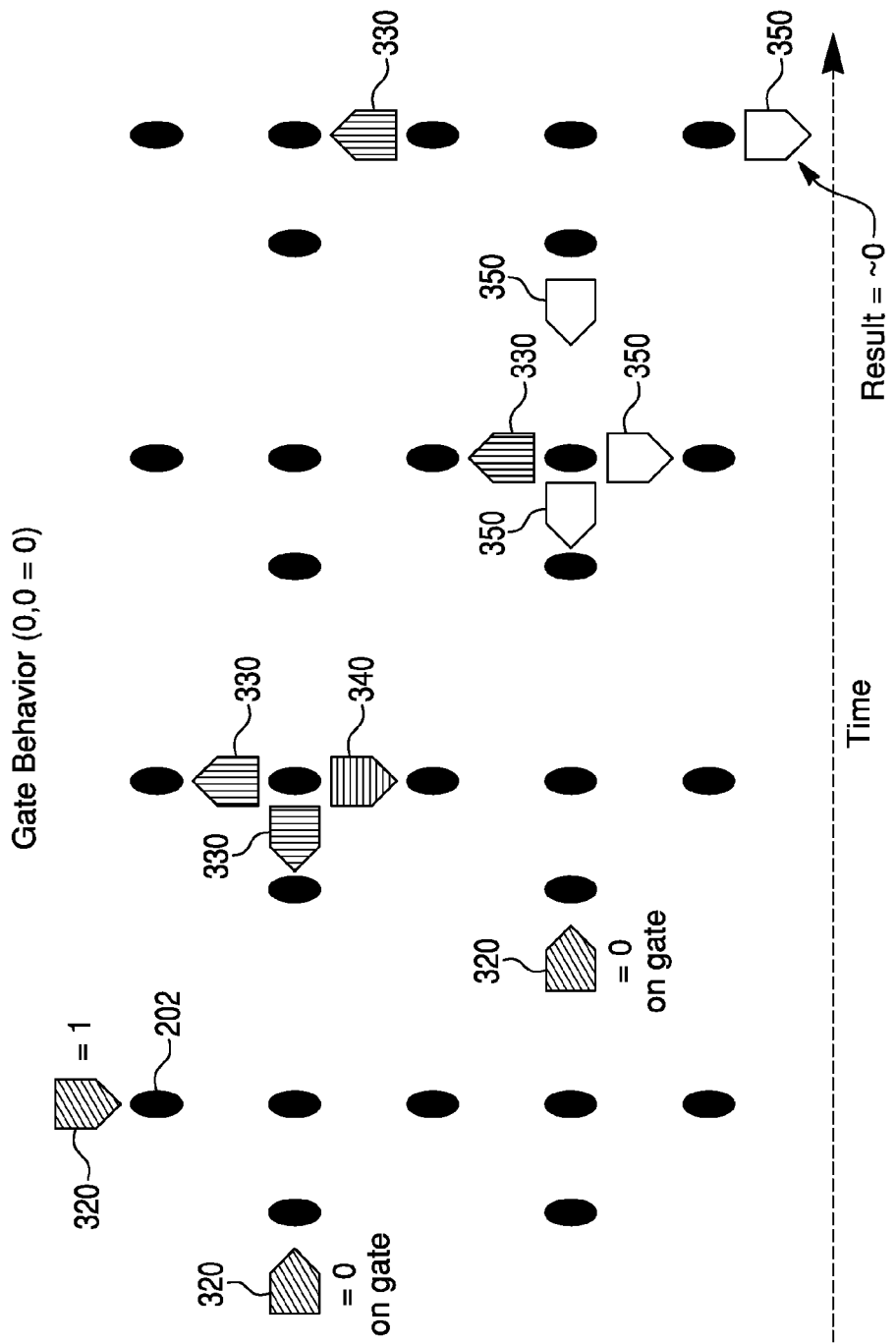

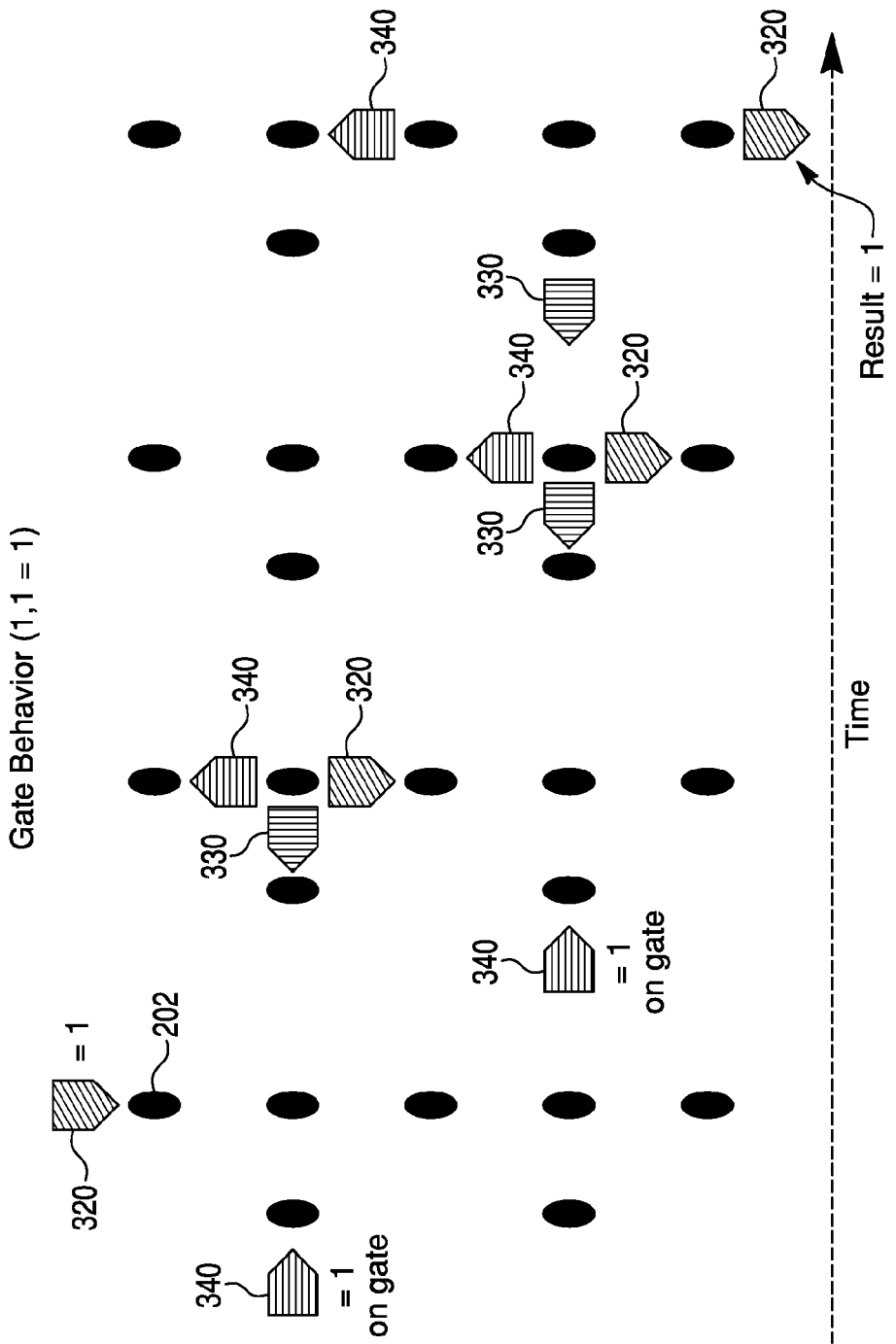

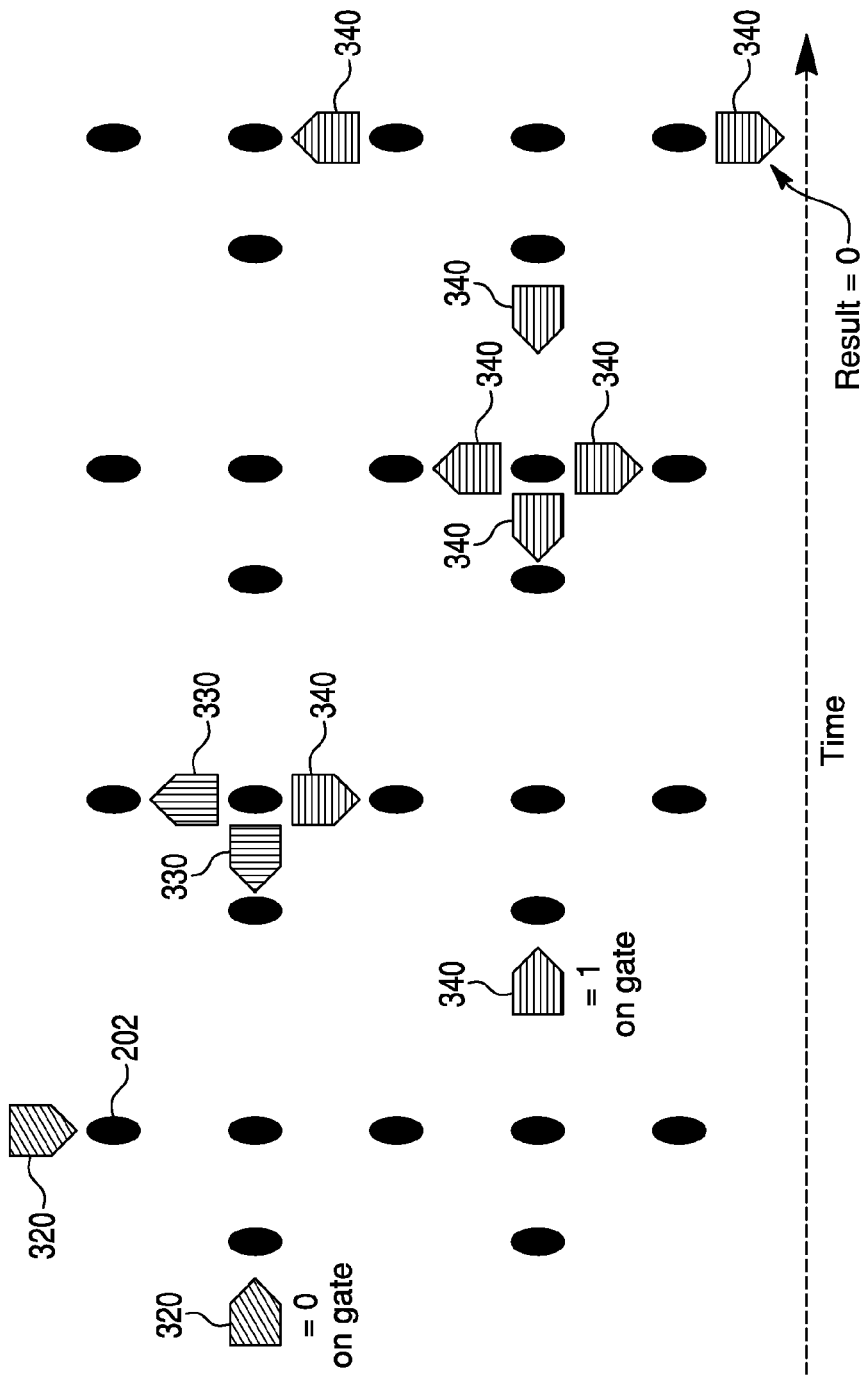

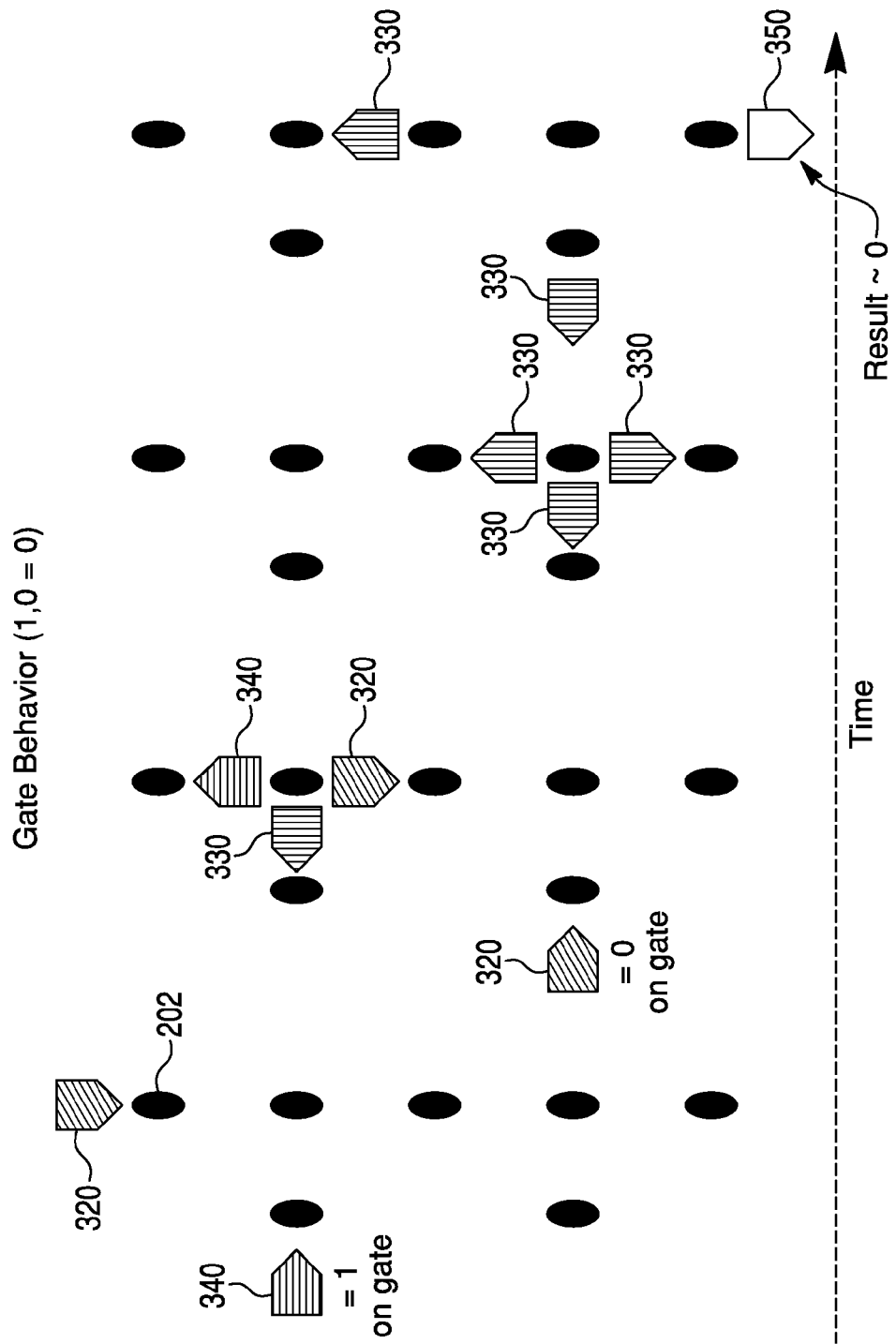

LOCALIZED PLASMON-POLARITON (LPP) LOGIC GATES AND COMPUTING

FIELD OF THE INVENTION

The present disclosure relates to an optical computer architecture using localized plasmon-polaritons (LPPs), and in particular the use of nano-particle chains supporting the propagation of LPPs for the purpose of creating ultra-high speed switching logic elements for computers.

BACKGROUND OF THE INVENTION

Much progress has been made in the past ten years or so in the understanding of plasmons (collective electronic charge clouds), polaritons (composite photonic-electronic clouds- or quasi-particles) and the like, such as the plasmon-polariton (PP).

While various publications have alluded to the possibility that one day electronic circuits may be made using such physics to provide an optical computer, to date it appears that no concrete proposals have been published illustrating how such new physics might be brought together to create useful functional computing devices. Indeed, it is by no means obvious as to how this might be done.

Previous scientists and engineers have considered and attempted all-optical computing—and most have failed to deliver a competitive processor, for one reason or another. The main achievements to date have been succinctly reviewed by Miller [Miller, D. A. B., (2010) 'Are optical transistors the logical next step?', Nat. Photon., 4, 3.], which sets out the considerable challenges that need to be overcome in order to replace today's electronic computing with optical computing.

It should be noted that throughout this literature and in many more research papers, there is frequent mention of the dream of making an optical computer using plasmons at some point in the future, [Maier, S. A., et al., (2001) 'Plasmonics—a route to nanoscale optical devices', Advanced Materials, 13, 1501.]. Surface-plasmon (SPP) circuitry was proposed by analogy to optical fiber wave-guiding and coupling by [Ebbesen, T. W. et al., (May 2008) 'Surface-plasmon circuitry', Physics Today, 44.]—but not localized PP (LPP) circuitry as discussed in this application. Indeed, LPP circuitry requires a quite different geometry, and a different set of physics. It appears that no such comprehensive device architectures have yet been created that permit computing-element logic-functionality based on LPPs.

SUMMARY OF THE INVENTION

According to one embodiment of the invention, there is provided a computing structure. The computing structure comprises at least one logic gate having an arrangement of nano-particles configured to propagate localized plasmon-polaritons (LLPs).

According to an aspect of the embodiment, the logic gate has a gate state and is configured to perform a logic function based on a desired logic output.

According to an aspect of the embodiment, the at least one logic gate is configured to perform a combinatorial logic function.

According to an aspect of the embodiment, the combinatorial logic function comprises one or more of an AND, OR, NAND, NOR, NOT or XOR logic function.

According to an aspect of the embodiment, the at least one logic gate is configured to perform a sequential logic function.

According to an aspect of the embodiment, the at least one logic gate comprises a flip-flop.

According to an aspect of the embodiment, the at least one logic gate is configured to perform a controlled not (CNOT) logic function.

According to an aspect of the embodiment, the at least one logic gate comprises four NAND gates.

According to an aspect of the embodiment, the nano-particles comprise portions arranged in chains allowing propagation of the LPPs along the chains.

According to an aspect of the embodiment, the portions arranged in chains include inter-connected, cross-connected or un-connected chains.

According to an aspect of the embodiment, the portions arranged in chains include a portion with a progressively different size of nano-particles such that LPPs traveling along the portion are converted into photons, photoelectrons, or alternative polarization states.

According to an aspect of the embodiment, a portion of the chains are arranged in a chain assembly comprising a linear or non-linear photonic junction between chains or a change in the direction of chains.

According to an aspect of the embodiment, the chain assembly includes a T-junction where a propagating LPP splits into two LPPs.

According to an aspect of the embodiment, the chain assembly includes a 90° change in direction where a propagating LPP changes its propagation direction by 90°.

According to an aspect of the embodiment, at least one of the chains comprises a nano-particle which is a gain particle for amplifying an LPP propagating to the gain particle through supply of gain.

According to an aspect of the embodiment, the gain particle is a quantum dot or a quantum wire, or a particle receiving photo-injection to amplify the LPP.

According to an aspect of the embodiment, the gain particle is arranged in a chain near the junction between chains or the change in the direction of chains.

According to an aspect of the embodiment, the nano-particles comprise nano-particles with shapes including spheres, spheroids, ellipsoids, cylinders, cubes, stars, rectangular-cubic, spiral-twisted, or v-shapes.

According to an aspect of the embodiment, the nano-particles are embedded within a matrix material, the nano-particles comprise at least one of a metal, a semiconductor, a doped oxide, a carbon nanotube, or graphene, and the matrix material comprises at least one of a Group IV, a Group II-VI, or a Group III-V semiconductor material.

According to an aspect of the embodiment, the metal comprises gold or silver.

According to an aspect of the embodiment, the nano-particles comprise doped semiconductors or oxides with doping levels between $10^{18}$ and $10^{22}$ free-carriers $cm^{-3}$.

According to an aspect of the embodiment, the nano-particle sizes are in the region between a characteristic dimension of 0.1 nm to 2000 nm.

According to an aspect of the embodiment, adjacent of the nano-particle sizes are spaced from each other by a spacing, the spacing being in the region between a characteristic dimension of 0.1 nm to 2000 nm.

According to an aspect of the embodiment, the nano-particle arrangement comprises a cross-connection portion, where propagating LLPs may propagate orthogonally to each other with minimal mode-interference.

According to an aspect of the embodiment, the computing structure further comprises a supporting substrate material in which the nano-particles are embedded.

According to an aspect of the embodiment, the supporting substrate material is a semiconductor material.

According to an aspect of the embodiment, the semiconductor material is one of a IV semiconductor, a III-V semiconductor, or a II-VI semiconductor.

According to an aspect of the embodiment, the nano-particles are arranged in chains to propagate a longitudinal or transverse mode of an LPP along the chain.

According to an aspect of the embodiment, the computing structure further comprises a laser, an LED, a super luminescent diode, or a quantum confinement structure light source arranged to provide excitation light into one or more of the nano-particles to excite an LPP.

According to an aspect of the embodiment, the light source is quantum confinement structure is one of a quantum dot, a quantum wire, or a quantum well.

According to an aspect of the embodiment, the light source is embedded within a chain of the nano-particles propagating the LPP, or is disposed externally to the chain.

According to an aspect of the embodiment, an excitation wavelength of the excitation light lies in the ultra-violet, visible or infra-red regions of the electromagnetic spectrum.

According to an aspect of the embodiment, an excitation energy of the excitation light is 100 femto-Joules or less.

According to an aspect of the embodiment, the computing structure further comprises an output providing a logic result; and a photon, photoelectron, or an electron detector arranged to detect the logic result.

According to an aspect of the embodiment, the detector is embedded within a chain of the nano-particles, or provided external to the nano-particles.

According to an aspect of the embodiment the nano-particles are arranged to execute logic functions at times less than or equal to 1000 femto-seconds ($10^{-12}$ seconds).

BRIEF DESCRIPTION OF THE DRAWINGS

FIG. 1 is a schematic of a computing structure according to an embodiment of the invention.

FIGS. 3A-3D are schematics illustrating the operation of an AND gate under the logic conditions (0,1), (1,1), (0,1), and (1,0), respectively, according to an embodiment of the invention.

DETAILED DESCRIPTION OF THE INVENTION

Figure 2A:
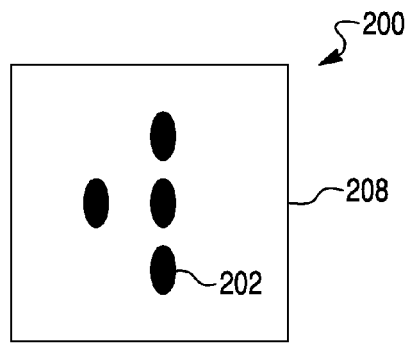
FIGS. 2A-2D are schematics of a transistor, AND gate, NOT gate and OR gate, respectively, according to an embodiment of the invention.

According one embodiment, some practical and manufacturable ways of assembling plasmon-polariton (PP) physics into rapidly switching electronic circuits that can be used for ultra-high speed computing in very small physical volumes whilst consuming extremely low power are provided. Device architectures and engineering details which may allow for computing with clock rates of around 100 femto-seconds ($10^{-13}$ s), i.e., operating some 4 orders of magnitude faster than today's fastest regular computers are described where 10 fs may also be possible according to certain embodiments.

Designs are provided with operational energies as small as 10 atto-Joules perhaps, and switching speeds of ~100 femto-seconds, together with at least the following capabilities, not all of which have been demonstrated simultaneously in any optical/photonic computing scheme constructed to date where the design remains small: cascadability, fan out, logic level restoration, input/output isolation, absence of critical biasing, and logic level independent of loss.
Background Physics and Building Blocks for LPP Based Logic and Computing Structures.

Below are described LPP excitation sources, waveguides, switches, modulators and other key nano-plasmonic concepts for providing an LPP based computer architecture.

Optical Switching

~100 Femto-Second Optical Switching

Nano-particle structure which provides 100 femto-second switching are described, for example, in Wurtz et al. [Wurtz, G. A., et al., (2011) 'Designed ultrafast optical nonlinearity in a plasmonic nanorod metamaterial enhanced by nonlocality', Nature, 6, 107.]. In Wurtz et al., ultrafast optical nonlinearity is observed in periodic arrays of metal nano-particles arranged as a meta-material. The nano-wires are arranged perpendicular to a glass substrate, enabling air to surround the nano-wires, and thus faster switching speeds than that restricted by the substrate being immediately adjacent to the particles' long axes.

The structure proposed by Wurtz et al. is approximately a 3D array of nano-particles. Wurtz et al. created an 80% switching-capability (optical density change of 0.7) employing only 7 mJ/cm$^2$ of light power. Based on this, 130 fs switching with 2 ps recovery time within a 100×100 nm$^2$ volume, 20 fJ power needs seems possible.

More importantly, coupled plasmonic nano-particles propagated energy through linear chains of coupled-nano-particles, yet within subwavelength spatial scale. In Brongersma et al [Brongersma, M. L. et al, (2000) 'Electromagnetic energy transfer and switching in nanoparticle chain arrays below the diffraction limit', Phys. Rev. B, 62, R13656.], cited in Wurtz et al., the energy propagation velocity is demonstrated at 0.1 c, i.e., 3×10$^7$ m/s. Double to triple this value is possible, depending on the nature/orientation of the spheroidal nano-particle shapes being used.

Recently, Baida et al. [Baida, H. et al, (2011) 'Ultrafast nonlinear optical response of a single gold nanorod near its surface plasmon resonance', Phys. Rev. Lefts., 107, 057402.] characterized a single nano-particle ultrafast nonlinear response, and related it to the nonlinearity of ensembles of particles. A 5 femtoJoule excitation energy plasmon response rise time of around 100 femto-seconds, and ~1 or 2 picoseconds fall time, for 43 nm×12 nm gold nano-rods embedded in a polymer were recorded in Baida et al. This response time would have been be significantly faster in air based on calculation.

Localized-Plasmons on a Single Nano-Wire

Chang et al. [Chang, D. E., et al., (2007) 'A single photon transistor using nano-scale surface plasmons', Nature Physics, 3, 807.] illustrates how plasmons may be localized on a single nano-wire, and that even single photon switching may be possible. Nano-wires offer excellent energy confinement, guiding even when their radius is very much less than the wavelength of light being used. As little as a single-photon incident on that nano-wire can cause the reflection of a propagating plasmon confined within it. Thus, here we have a nano-plasmonic switch operated by incident light, on/off, based on reflection/transmission. Wire diameters of 10 nm are appropriate, and a single photon level transistor action was obtained.

Propagation of Plasmons Using Nano-Particle Chains

Plasmons may be propagated in a waveguiding fashion by using arrays of nano-particles, side-by-side or end to end, depending, respectively, on whether transverse or longitudinal localized plasmon-polaritons (LPP) are to be propagated. By contrast, surface PPs (SPPs) propagate on corrugated metal surfaces over length scales of millimeters or centimeters. The SPP case is too large for a competitive electronics technology compared to nano-CMOS. For LPPs, approximately 10 nano-particles behave like an infinite chain.

LPPs propagate hundreds of microns but with much greater loss than SPPs. The light confinement, however, is very much less than the wavelength of light used. Thus, beneficially, gain may be used to offset the propagation losses, as discussed and quantified by Maier [Maier, S. A., (2006) 'Gain-assisted propagation of electromagnetic energy in sub-wavelength surface plasmon polariton gap waveguides', Opt. Comm. 258, 295.].

There is a trade off in LPPs between localization and loss. LPP tight localization places much of the energy inside the metal nano-wires, and thus ohmic heating may become significant, as much as 6 dB/micron propagated. Conically tapered nano-wires may be used to exchange plasmon-polariton energy from inside the nano-wire to inside the surrounding dielectric medium, in which the nano-wire is embedded. This is useful for LPP waveguide interconnects.

Metallic chain nano-particle 'waveguides' allow for the long distance transmission of LPPs. Longitudinal mode coupling can take place with spheroidal LPPs, and the transverse mode coupling between LPPs placed side-by-side can be very strong. Here we have guided transverse modes, and when the nano-wire diameter is very much less than nano-wire spacings, for the strong absorption case, the mathematics simplifies essentially to dipolar coupling calculations.

A particularly useful advantage of LPPs over SPPs is that once LPPs are in use, the plasmonic waveguides can turn sharp corners, unlike the SPP case, or that of photonic crystals, which are far too large, on the light-wavelength scale, to do so [Brongersma, M. L. et al, (2000) 'Electromagnetic energy transfer and switching in nanoparticle chain arrays below the diffraction limit', Phys. Rev. B, 62, R13656.]. Nano-particle chains may also be arranged to provide T-shaped LPP splitters or combiners, as discussed below.

A particularly useful observation is that in turning a 90 degree corner, it is possible to exchange energy from a longitudinal to transverse modes of an LPP, or vice versa. This is especially useful in LPP logic circuits to dump unwanted reflected energy from switching operations. Energy losses in the corner turning process, however, do require gain-compensation.

Chain Plasmon-Polariton Waveguides, and Guided Plasmon-Polariton Modes

Maier [Maier, S. A., et al., (2001) Plasmonics—a route to nanoscale optical devices', Advanced Materials, 13, 1501.] discussed the creation of plasmonic waveguides using close spaced metal nano-particles. The coupling associated with close spaced nano-particles leads to energy propagation along the array, as briefly described above. There are guided LPP modes in strongly coupled nano-wire assemblies as described by Wurtz et al. [Wurtz, G. A., et al., (2008) 'Guided plasmonic modes in nanorod assemblies: strong electromagnetic coupling regime', Optics Express, 16, 7460.], in which the electromagnetic field distribution associated with a mode is between the nano-wires and propagates normally to the nano-wires' long axes. This concept can be used to guide light and manipulate it at the nano-scale. However, there can be radiation and resistive losses as much as 6 dB/micron propagated, very large lengths by nano-scale proportions, but this loss may be compensated using gain, as described below. Losses may also be minimized by using a correctly oriented spheroidal nano-particle in the chain, and by ensuring that $k>\omega/c$, where k is the modal wavevector, $\omega$ is the angular-frequency of the LPP, and c is the velocity of light.

Clocking and Phasing of LPPs

In an LPP transistor, the LPP is propagating along one chain particle pair at a time. If the LPP-pulse is too short in length, then the correct field strengths will not be present on the correct nano-particles in the chain at the time they are required for a computational state change, or switching.

For the example of spherical gold nano-particles of 50 nm diameter in air, if the nano-particles in the LPP-chain are spaced by 75 nm, where we have $\sim 6 \times 10^7$ m/s for the longitudinal mode LPP propagation velocity, the LPP-mode is only resident on a single nano-particle in the chain for around $1.25 \times 10^{-15}$ seconds; around 1-2 femto-seconds. This is too short a time for correct computation to be completed elsewhere in the structure where the LPP has yet to arrive according to one embodiment.

For this reason, the LPP photon pulse should be <~100 femtoseconds long, if the logic switching time is of a similar time scale. Under this arrangement, there will then be a series of near identical LPP fields propagating on the chain of nano-particles adjacent to each other, analogous to the continuous voltages being applied to a conventional transistor or other component according to one embodiment.

Figure 8:
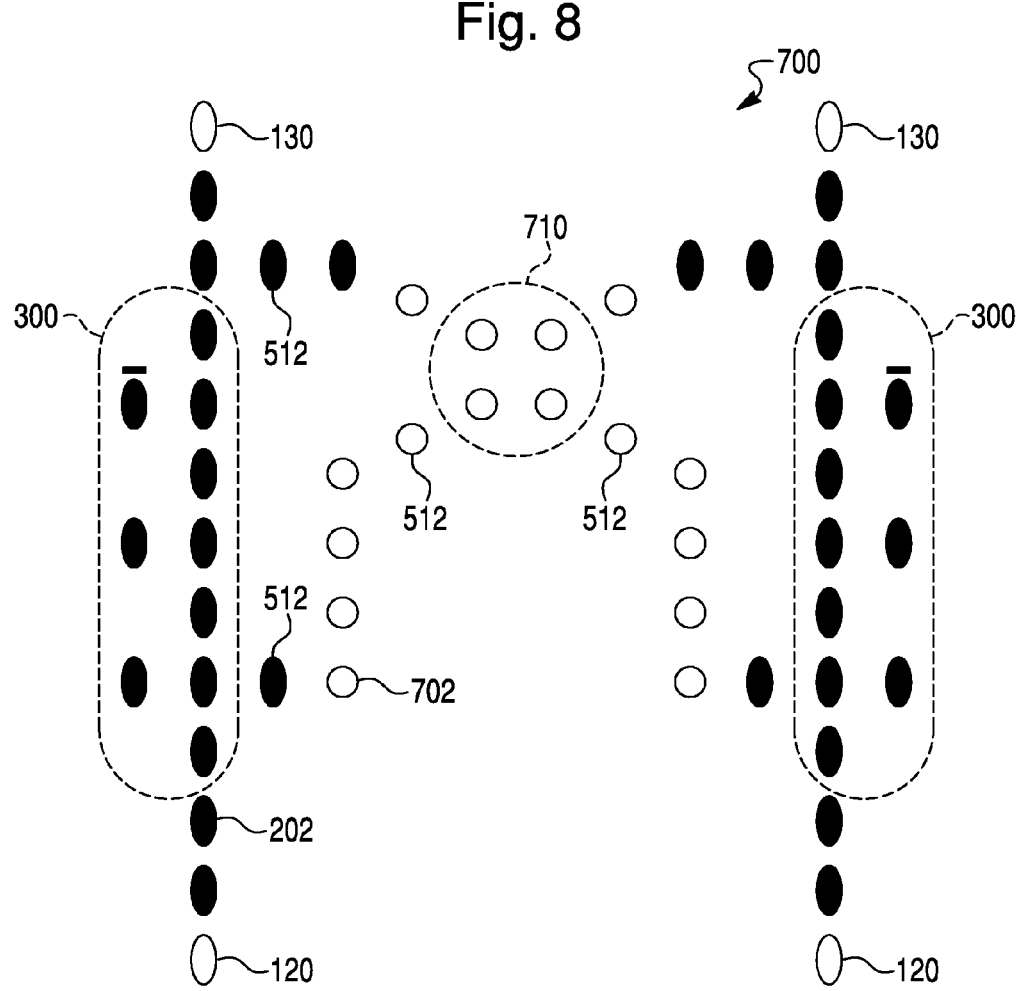
FIG. 8 is a schematic of a flip flop structure based on LPP propagation, according to an embodiment of the invention.

Now, for example, when the LPP-cross-connection necessarily occurs in a flip flop, such as in shown in FIG. 8 and discussed there, the correct LPP field-strengths will be present to meet the intersecting LPPs; and the correct LPP state change can occur.

Mode-locked femto-second lasers described by Brown et al. [Brown, C. T. A., et al., (2004) 'Compact laser-diode-based femto-second sources' New J. Phys., 6, 175.] could be used as repetitive pulse photon sources to provide the necessary LPPs and their pulse length requirement. In order to create correctly phased pulse-inputs into different parts of the complete LPP-computing circuitry, it is necessary to time delay some of these laser pulses, both to drive different logic gates and to pump gain nano-particles.

It is to be noted that the LPP-modes are self-propelling, they do not need to be 'clocked-along' as do 'bits' in conventional electronic computing.

Gain in Plasmonic Waveguides

Krasavin and Zayats [Krasavin, A. V., and Zayats, A. V., (2010) 'Silicon-based plasmonic waveguides', Optics Express, 18, 11791.] considered silicon plasmonic waveguides and discovered that gain can be generated that offsets losses incurred during plasmon propagation. Silicon is a dipolar gain medium. Waveguide bends of 500 nm radius were demonstrated for a wavelength of 1550 nm, a standard telecommunications laser emission. Gain used to offset PP propagation losses was discussed and quantified by Maier [Maier, S. A., (2006) 'Gain-assisted propagation of electromagnetic energy in sub-wavelength surface plasmon polariton gap waveguides', Opt. Comm. 258, 295.] and demonstrated by Noginov et al. [Noginov, M. A. et al, (2007) 'The effect of gain and absorption on surface plasmons in metal nanoparticles', Applied Physics B, 86, 455.]

A related route to achieve gain with metal nano-particle chains was explored by Citrin [Citrin, D. S. (2006) 'Plasmon-polariton transport in metal-nanoparticle chains embedded in a gain medium' Optics Letters, 31, 98.], who considered embedding the chains in a gain medium to offset attenuation. In particular Citrin found that transverse modes could be preferentially amplified in this manner, under certain geometric constraints.

As still another mechanism for achieving gain, embedded quantum-dots in a chain LPP waveguide may be used to amplify LPPs when they arrive at that particle/dot. Quantum-dots and their internal energy levels, related to logic functions, were reviewed by Ohtsu et al. [Ohtsu, M., et al, (2008) 'Principles of Nanophotonics', CRC Press, pp 117-125.].

LPP Excitation Sources

Polariton Lasing

As one example of an excitation light source for exciting an LPP, there is the 'spaser', a surface plasmon laser, demonstrated by Noginov et al [Noginov, M. A. et al., (2009) 'Demonstration of a spaser-based nanolaser', Nature, 460, 1110.], for example. In this structure nano gold core particles are surrounded by a glass like shell filled with a dye. This is a plasmon-polariton source, especially in its electrically pumped form.

Light-Controlled Photon-Tunneling

Smolyaninov et al [Smolyaninov, I. I. et al., (2002) 'Light-controlled photon tunneling', Applied Physics Letters, 81, 3314.] demonstrated light controlled photon tunneling by a photon blockade effect that involves stopping the transmission of light of one color by use of light at another color at a nano-plasmonic pin hole in a metal surface. This structure can be used to create a 'controlled-NOT' (CNOT) gate for quantum computing at room temperature, for example, where the CNOT gate is described below.

LPP Modulator

MacDonald et al [MacDonald, K. F., et al., (2009) Ultrafast active plasmonics', Nature Photonics, 3, 55.] described non-linear interactions in the 'skin-layer' of a metal along which a plasmon is propagating, thus providing an example for ultrafast modulation. 200 femto-second effects may be attained. Femto-second optical frequency plasmons can propagate along a metal-dielectric interface and can be modulated on the fs timescale by ultrafast excitation of the metal leading to ~4 orders of magnitude faster modulation than existing technologies. Dionne et al. [Dionne, J. A., (2009) 'PlasMOStor: A metal-oxide-Si field effect plasmonic modulator' Nano Letters, 9, 897.] demonstrated a MOS field-effect plasmonic modulator of a much greater size (~micron scale) than would be appropriate for a nanoscale device.

Logic State Detectors for LLP

Another element needed for a nano-computer system is a nano-detector. Hayden et al. [Hayden, O., et al., (2006) 'Nanoscale avalanche photodiodes for highly sensitive and spatially resolved photon detection', Nature Materials, 5, 352.] provide an excellent overview of nano-avalanche-photo-diode capabilities. Such nano-avalanche-photo-diodes may be used for nano-detection of a logical state of an LLP gate structure.

Logic state detectors can be implemented by nano-detectors embedded into the LPP-chain such as by nano-avalanche-photo-diodes capable of single photon counting, or analog photo current operation [Hayden et al, 2006], or externally using similar semiconductor detectors for the input, such as via a Scanning Near Field Microscope (SNOM) tip placed immediately adjacent to the final nano-particle in the LPP logic chain, optically to extract the final photons. The same two detection methods can be used for a quantum computing logic system, to determine the resultant qubit properties.

LPP Logic Structures

A fundamental basis of optical transistors [see Pratt, G. W., and Jain, K., (1983) 'Optical transistors and logic circuits employing the same'. U.S. Pat. No. 4,382,660.] is a nonlinear (second harmonic generation) material in the 'base' region, operated by a control signal port, to modulate, such as by frequency doubling or color change, the light connection between an input port and an output port (being analogs of the 'emitter' and 'collector' of a standard transistor).

FIG. 1 is a schematic of a computing structure with at least one logic gate, where the logic gate is based on an arrangement of nano-particles configured to propagate LLPs, according to an embodiment. The computing structure 100, which may be part of a computer, includes logic components 110, where each of the logic components 110 comprise an arrangement of nano-particles, such as for example logic components as described further below. The computing structure 100 further includes LLP excitation light sources 120 arranged to provide LPP excitation light into the logic components 110, and logic state detectors 130 arranged to receive light and detect the logic state of a corresponding one or more of the logic components 100. The computing structure 100 may further include gain particles 140 arranged to provide optical gain as necessary in the computing structure 100. The nano-particles of the logic components may be arranged in chains, including inter-connected, cross-connected or un-connected chains, for example.

The LLP excitation light sources 120 may be may be a laser, an LED, a super luminescent diode, or a quantum confinement structure light source, for example. The LLP excitation light sources 120 may be a quantum confinement structure being one of a quantum dot, a quantum wire, or a quantum well, for example. The light sources 120 may be embedded within a chain of the nano-particles propagating the LPP, or be disposed externally to the chain, for example. The excitation wavelength of the excitation light from the excitation light sources 120 may lie in the ultra-violet, visible or infra-red regions of the electromagnetic spectrum, for example. The excitation energy of the excitation light is 100 femto-Joules or less.

The logic state detectors 130 may be a photon, photoelectron, or an electron detector arranged to detect a logic result, for example. The detectors 130 may be embedded within a chain of the nano-particles, or provided external to the nano-particles.

Basic LPP Logic Structure Concepts

Basic LPP logic components and their layouts are shown schematically in FIGS. 2A-2D, which respectively illustrate a transistor, AND gate, NOT gate and OR gate. The transistor 200 may comprise a number of nano-particles 202 embedded in a matrix material of a substrate 208. For example, the transistor 200 may comprise three nano-particles 202 in a row in a vertical column, and another particle 202, adjacent the middle of the three, to act as the gate with the middle nano-particle, where the particles 202 are of an appropriate shape, such as spheriodal or spherical nano-particles, and size, such as 0.1 nm to 2000 nm, or preferably 10 nm to 50 nm in characteristic size. The spacing between adjacent nano-particles may be 0.1 nm to 2000 nm, or preferably 10 nm to 50 nm in characteristic size. The nano-particles 202 are arranged in the substrate such that the LPPs may propagate along particles 202; for example, where they can propagate with a velocity of ~0.2 c, ie, $6 \times 10^7$ m/s or more according to one embodiment [Maier, S. A., (2006) 'Gain-assisted propagation of electromagnetic energy in sub-wavelength surface plasmon polariton gap waveguides', Opt. Comm. 258, 295.].

Spheriodal or spherical nano-particles are preferred over nano-rods or nano-wires, because using nano-rods or nano-wires for the propagation of a PP in a lengthwise connected chain will have a very high loss for their longitudinal/axial-mode propagation according to one embodiment. It is the transverse rod mode that propagates with low loss, but only in a chain of close-coupled nano-particles.

In the transistor structure shown in FIG. 2A, the two nano-particles 202 placed side-by-side act as the 'gate' (or 'base' in other transistor terminology), for when the correct gate state is on the lefthand side nano-particle 202, it can cause the chain propagation along the vertical-column (the three nano-particles in a row) to be stopped. Without that gate state on the lefthand side nano-particle, chain propagation of the LPP can continue along the vertical column of three nano-particles. The gate state will depend on the LLP state that has been applied to the gate by an LPP excitation source. The 'clocking' and phasing aspects of this device are discussed above in the clocking and phasing of LLPs section.

Figure 2B:
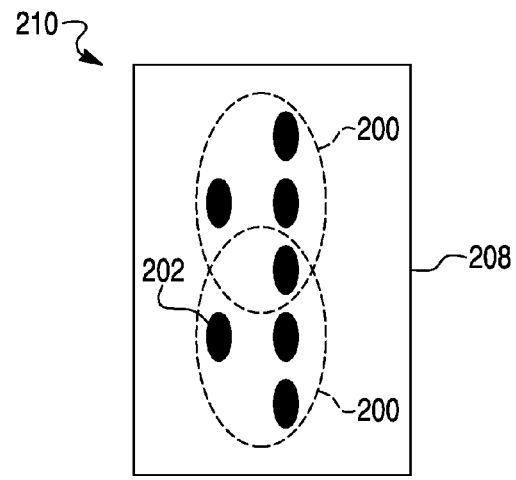

FIG. 2B illustrates a structure 210 for an AND logic function. The AND logic function comprises two LPP transistors, such as described in FIG. 2A, in series, now with the required two gates shown as the lefthand side nano-particles 202.

Figure 2C:
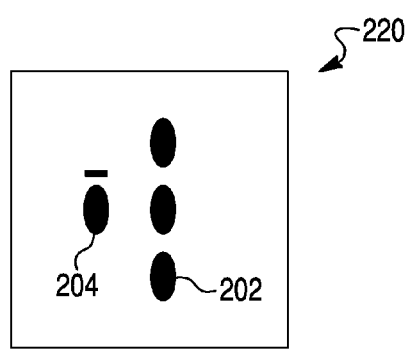

FIG. 2C illustrates a structure 220 for a NOT logic function. The NOT function is a transistor with an 'inverse' gate state applied to the transistor gate nano-particle (the nano-particle 202 on the left), denoted by a bar over the lefthand side gate nano-particle.

Figure 2D:
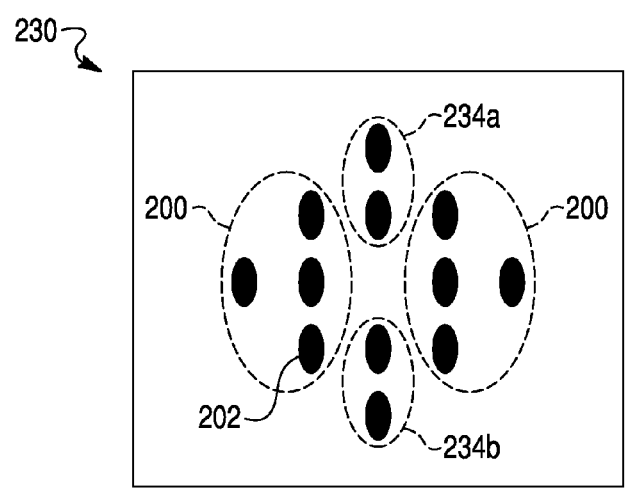

FIG. 2D illustrates a structure 230 for an OR logic function. This structure has two transistors connected in parallel, on the left and right hand side in FIG. 2D, respectively. This structure further has the two transistors connected with lateral (transverse mode) coupling to center nano particles arranged as a top chain 234a and a bottom chain 234b of nano-particles. The logical OR function can be created to act on the propagating LPP that enters top chain 234a or bottom chain 234b.

Operation of LPP Logic Gates

At the most fundamental level, the LPP logic gates rely upon the interactions of two or more LPPs at an 'instant' in time. Plasmonic state-interaction and non-linear photonics math involves creation of the Hamiltonian (including second-order and/or third-order nonlinear-photonics terms: $\chi^{(2)}$ & $\chi^{(3)}$ respectively) to describe the energy-splitting and reflectivities of propagating LPPs in interacting nano-particle waveguides, the effects can be quantified as a function of LPP-phasing (relative arrival times/positions). This allows the quantitative design of nano-plasmonic logic gates, emerging LPP energy distributions and directions; and energy-recycling, if needed.

The Hamiltonian components include 3 major terms—(1) the creation and annihilation of plasmon states, (2) the plasmon-coupling terms, including necessary non-linear photonics (nano-particle size, spacing and particle/host-materials dependent), and (3) damping/dissipation terms (losses/heat). From these terms, how the plasmons will collide and propagate energy along the interconnecting plasmon nano-particle waveguides can be calculated, as a function of energy density, field-strength etc.

In the course of constructing a standard electronic AND gate, it is usual to couple two transistors, and have signals applied to the transistor gates that affect the passage of signals applied to the emitters/drains of the transistors, via some non-linear interaction. This is described in electronics textbooks as the basis of logic operations and computing, e.g., where the standard logic Truth Table is:

| Inputs | | |
|---|---|---|
| A | B | AND |
| 0 | 0 | 0 |
| 0 | 1 | 0 |
| 1 | 0 | 0 |
| 1 | 1 | 1 |

In the nano-photonic construction of AND-gates, two possibilities are possible, the new scheme being entirely non-obvious, but potentially advantageous for design simplification:

Nano-Photonic Construction of AND-Gates (and OR Gates)

Firstly, the standard electronic style of logic operation under non-linear conditions, where photonic non-linearities are provided by using nano-scopic second-order or third-order non-linear susceptibilities, $\chi^{(2)}$ or $\chi^{(3)}$ respectively, is described. Nano-particle second-order nonlinearity generation has been described by Zhang et al, [Zhang et al., Nano Letters, DOI: 10.1021/nl2033602, 2011], and involves nano-particle asymmetry such as hemispherical nano-cups. Nano-particle third-order non-linearity has been described by Suh et al, [Suh et al, Nano Letters, DOI: 10.1021/nl2034915, 2011], and involves nano-particles with increased 3D-nano-scale structure, such as dimers or bow-tie structures. In one embodiment, the necessary non-linearity is indeed available at the nano-scale, as required.

Secondly, a scheme can be created involving little or no non-linearity, by adopting the convention of applying to the photonic-transistor gates, which differs from the scheme of using the signal usually required on the electronic-transistor gates (i.e., with implicit non-linearity). The usual electronic logic states' convention is still applied to the photonic emitter and drain states. At first sight this second scheme may seem unusual, but it works logically, and opens up a whole new circuit design domain and set of capabilities that may be useful in complex photonic state logic and computing.

FIGS. 3A-3D illustrate the operation of a logic gate, and in particular, an AND gate, according to an embodiment, under the logic conditions (0,0), (1,1), (0,1), and (1,0), respectively, as a function to time, where FIGS. 3A, 3C and 3D provide a logical result 0, while FIG. 3B, i.e. the (1,1) condition, provide a logical result 1. The logic condition (i,j) represents the logic condition i on the top gate and logic condition j on the bottom gate shown in FIGS. 3A-3D. In FIGS. 3A-3D, the conditions of non-zero transmitted energy 320 (Logical 1 in signal; 0 on gate), non-zero reflected energy 330 (Ignore except in Result), zero transmitted energy 340 (Logical 0 in signal; 1 on gate), and zero or near zero reflected energy 350 are shown.

If there is a control LPP present on either gates A or B (where A and B represent the top and bottom gate, respectively), here representing 0, or both A, B simultaneously (thus the 3 conditions 0,0; 0,1; or 1,0), then the waveguide-propagating LPP (WG-LPP) cannot propagate (it is reflected), so the logic output F is 0. This is shown in FIGS. 3A, 3C and 3D.

If simultaneously there is no control LPP on A and B (here representing 1—thus the condition 1,1, then the WG-LPP propagates (it is not reflected at either gate), so the logic output F is 1, as shown in FIG. 3B. That is the only condition for a WG-LPP=1 to propagate when controlled by A, B states. The Truth table for this scheme becomes for gates A and B with logic output F:

| AB | F | F = A AND B |
|----|---|---|
| 0 0 | 0 | F caused by presence of control LPPs on A, B |
| 0 1 | 0 | F caused by presence of control LPP on A |
| 1 0 | 0 | F caused by presence of control LPP on B |
| 1 1 | 1 | F caused by absence of control LPPs on A, B |

Careful thresholding of the output states should be used to ensure a clear discrimination of 1 and 0.

Universal Logic Gates and Combinatorial Logic

The above basic AND, OR and NOT structures may be used to create the standard Universal logic structures, such as NAND and NOR structures. An XOR structure may be formed using four cross connected NAND gates as described later.

Figure 4A:
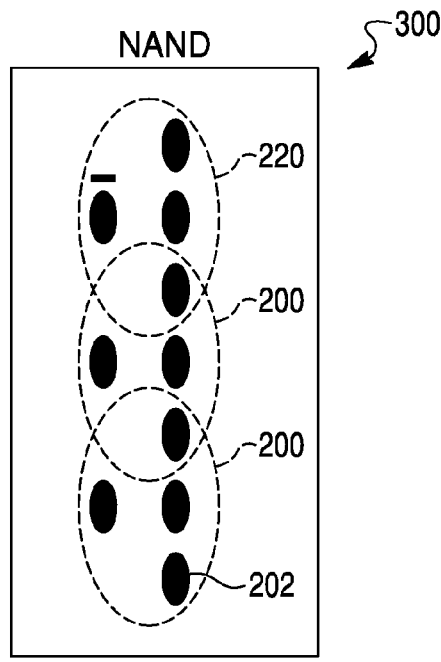
FIGS. 4A and 4B are schematics of a NAND structure and NOR structure, respectively, according to an embodiment of the invention.
Figure 4B:
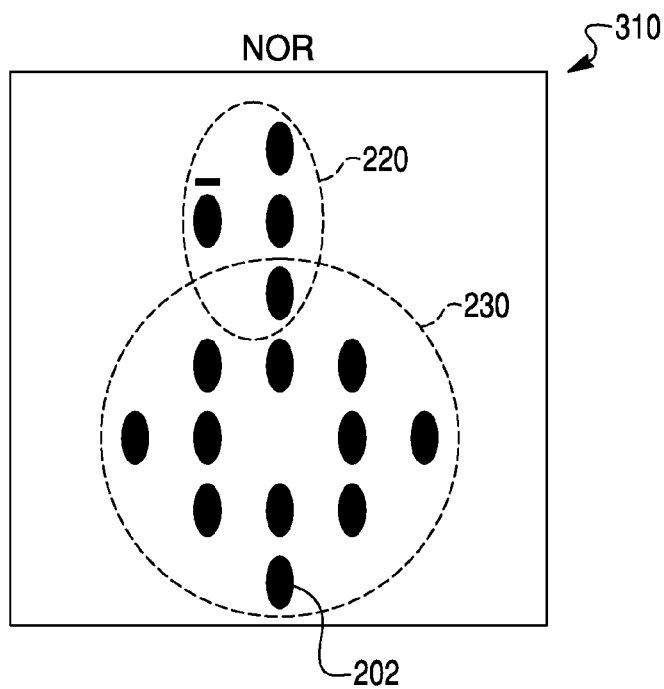

FIGS. 4A and 4B illustrate a NAND and NOR structure, respectively, formed based on the structures from FIGS. 2A-2D. The 'clocking' and phasing aspects of these devices are discussed above in the clocking and phasing of LLPs section.

A simple NAND structure 300 in FIG. 4A is made by using serially the two transistor AND function of transistors 200, followed by the NOT function 220. This structure uses 10 nano-particles 202. The LPPs move from the bottom of the page towards the top.

A simple NOR structure 310 in FIG. 4B is made by using in parallel the two transistor OR function 230 followed by the NOT function 220. This structure uses 15 nano-particles. LPPs move from the bottom of the page towards the top.

These structures provide a smaller area consumption and nano-particle count advantages for the NAND function. It is well known that NAND logic allows all computing logic elements to be constructed. This fact can be taken advantage of by conceptually mapping the nano-particle NAND structure 300 shown in FIG. 4A onto the vast array of known and used NAND-based computing architectures.

Chain Propagating Plasmons Around Corners—and Fan-Out

Figure 5:
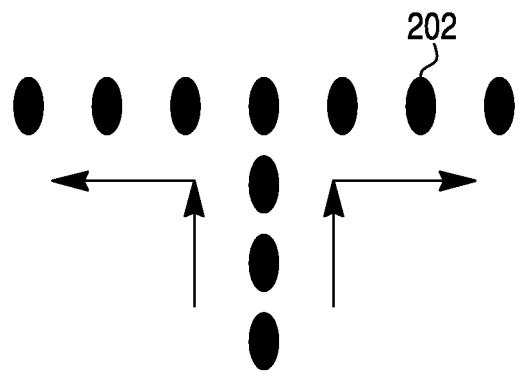
FIG. 5 is a schematic illustrating the propagation of LPP at a T-junction.

In order to create NAND (or NOR) based computers based on LPP structures, propagating LPPs need to turn sharp corners and fan out, where a scheme for turning sharp corners was solved during some early experiments on plasmons and their properties. The scheme for solving the problem of chain propagating LPPs around corners is shown in FIG. 5, based on the work of Brongersma et al. [Brongersma, M. L. et al, (2000) 'Electromagnetic energy transfer and switching in nanoparticle chain arrays below the diffraction limit', Phys. Rev. B, 62, R13656.]. The chains may be arranged to comprise a linear or non-linear photonic junction between chains or a change in the direction of chains.

Two points concerning turning corners are noted. Firstly, the redirection of chain propagating LPPs through sharp, 90 degree corners is possible. Secondly, the splitting of the chain propagating LPP into two chain propagating LPPs is possible, which constitutes an elementary form of the required fan out needed in order to enable large scale computing structures to be created.

Figure 6A:
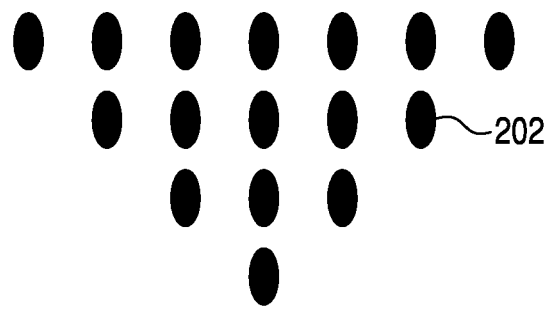
FIG. 6A is a schematic of one fan-out structure.
Figure 6B:
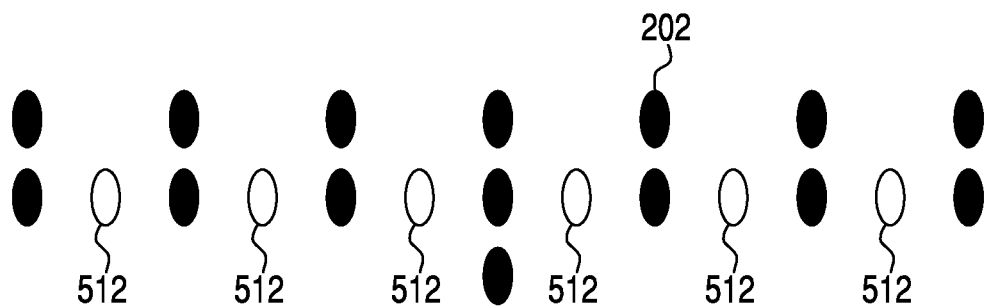
FIG. 6B is a schematic of another fan-out structure having a T-junction, according to an embodiment of the invention.

A further structure of the 'fan-out' concept is shown in FIGS. 6A and 6B. The FIG. 6A nano-particle arrangement would fan-out from 1 to 7 chains. Picking up the LPPs at outputs of the chains will cause interferences of adjacent LPPs, and so this arrangement is not preferred. The better solution for fan out is shown in the FIG. 6B nano-particle configuration, illustrated as a T junction, also showing fan out from 1 to 7 chains, but now, because of the separation of the 7 outputs, the LPPs can each individually be taken forward elsewhere without adjacent LPP interference.

An aspect of fanning out which must be considered is the loss of strength of the LPPs due to the division of their energy upon splitting. However, gain may be introduced into the nano-LPP system here, to compensate both for propagation losses and also to compensate for energy-splitting. Gain can be introduced by having individual gain nano-particles 512, such as highly-doped-plasmonic and energy pumped quantum dots of the correct wavelength, placed between each set of columnarly arranged nano-particle pairs, such that the nano-particles 512 are in an LLP propagation path along the nano-particles. This arrangement is shown in FIG. 6B. The gain may be acquired while the LPPs are propagating sideway, or vertically, as needed.

Sequential Logic Structures Such as Flip Flops and Other Clocked-Circuits

Sequential logic structures allow for the creation of computers from the combinatorial logic structures just described. A most basic sequential logic structure is the flip flop, and many different variants of the flip flop are known and used. A simple version of the flip flop is described below with respect to FIG. 7.

The basic flip flop comprises two cross-coupled NAND logic-structures. Many other types of flip flops are possible, also using cross-coupled NAND gates: J-K, D-type, SR-type etc. For J-Ks, counters, registers, memory, shift-registers, arithmetic, CPUs, etc., and complete computer construction, universal NAND structures must be inter-connected per the standard logic circuits used today, such as described in Mano [Mano, M. M. (1979), 'Digital Logic and Computer Design', Prentice Hall Inc.], but now using LPP components.

Figure 7:
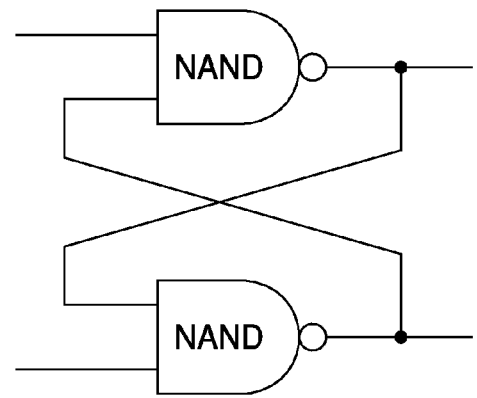
FIG. 7 is a schematic of a flip flop structure.

FIG. 8 recreates the basic flip-flop shown in FIG. 7 based on the 10 nano-particle plasmonic NAND gates 300 illustrated FIG. 4A, where the NAND gates are cross-coupled. The 'clocking', internal propagation-delay and phasing aspects of this device are discussed in the clocking and phasing section above.

The basic flip-flop 700 further includes a cross-coupling section 710 which allows for the cross-coupling the chain propagating LPPs without interference between the propagating LLPs. If two chains are brought together, where the nano-particles are made of spheres or spheroids, the adjacent nano-particles at the intersection vertex will be close enough for the two propagating LPPs to co-interfere and destroy or corrupt their information. It is noted that orthogonal nano-wires or nano-rods can couple to adjacent wires/rods without interference, as the longitudinal and transverse LPP modes are orthogonal.

To avoid interference in the cross-coupling section 710 shown in FIG. 8 the shape of the nano-particles 202 are important. In this case, we choose to convert the chain propagating LPP mode from spheroidal nano-particles to spherical to turn the corners of the flip-flop nano-particle arrangement, and then convert nano-spheroidal/spherical to nano-wires/rods nano-particles at the cross-coupling section 710. The nanoparticles 702 are arranged at cross-coupling section 710 aligned in a square/diamond-shape for their now transverse mode LLPs to cross-couple, without interference.

The flip flop 700 in FIG. 8 further includes LLP excitation light sources 120 arranged to provide excitation light into the logic components of the flip flop 700, and logic state detectors 130 arranged to receive light and detect the logic state of the flip flop.

There are energy-losses associated with this mode-conversion and propagation process, but these can be compensated as discussed with respect to FIG. 6B.

Quantum Computing (QC) Elements Using Nano-Plasmon-Polaritons

A further aspect of nano-LPP computing approach described here is that quantum-computing (QC) gates may be fashioned based on the structures described above. The fascination of QC stems from the capacity of a QC Register being 2 raised to the power of the number of qubits (quantum bits; all values 0 to 1 are now possible) being used. Even a few dozen qubits offers vast computational power, if such a scheme could be realized in practice. Just 500 qubit-computation (i.e., $2^{500}$ states-superposition, each state being classically equivalent to 500 1's and 0's) would offer the classical equivalent of $\sim 2^{150}$ separate processors. Any quantum operation on that 500-qubit system, whose action might be to execute a controlled-NOT (CNOT) operation on, say, the $100^{th}$ and $101^{st}$ qubits, would simultaneously operate on all $2^{500}$ states. In one operation, the quantum operation computes not just on one machine state, as serial computers do, but on all $2^{500}$ states at once.

The basic work-horse of quantum-computing is the controlled-NOT (CNOT) gate, its classical-computing analog being the exclusive OR, i.e., XOR gate [see Nielsen, M. A. and Chuang, I. L., (2004) 'Quantum Computation and Quantum Information', Cambridge University Press.]. The classical computing XOR function is usually realized by using four NAND structures [see Mano, M. M. (1979), 'Digital Logic and Computer Design', Prentice Hall Inc.], as seen in FIG. 9.

Figure 9:
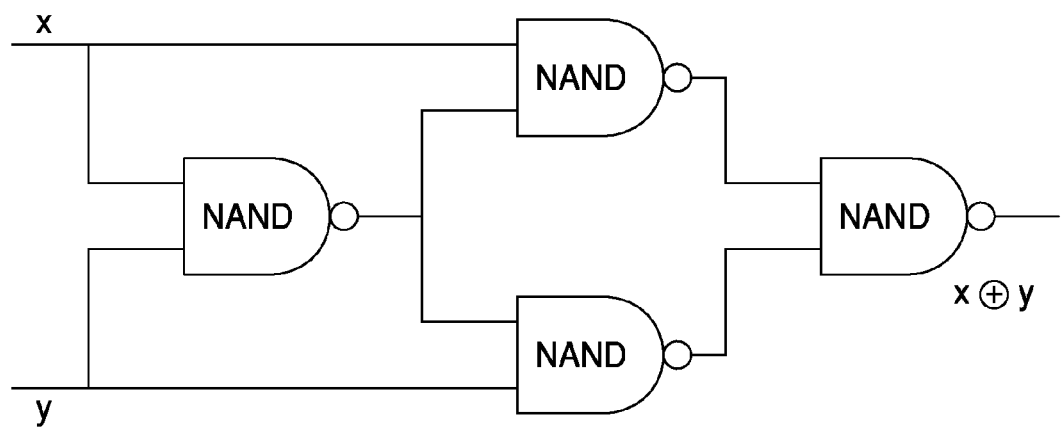
FIG. 9 is a schematic of a CNOT structure with four NAND gates.
Figure 10:
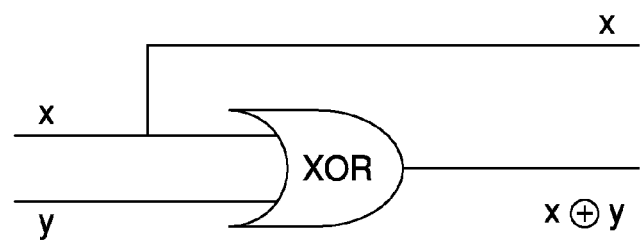
FIG. 10 is a schematic of an overall CNOT structure.

The quantum computing version, CNOT is realized by using four nano-particle NAND-gates such as shown in FIG. 4A, now coupled together as per FIG. 9. The overall CNOT structure is realized as per FIG. 10.

CNOT gates are used for disentangling Einstein-Podolsky-Rosen (EPR) states. The CNOT gates flip the second (target) qubit if and only if the first qubit (control) is 1. An important concept about LPP gate structures is that you can direct-write the quantum-state (qubit) onto a nano-particle as the LPP input, to prepare it for QC processing.

Quantitative LPP Logic-Gate Design and Construction

Example of LPP Logic Gate Design

Below is provided an example of an LPP system to provide quantitative criteria for the system. Of course, the present invention is not limited to this example. In this example, the nano-particles are made of gold, where the nano-particles comprise spheres, spheroids and short nano-wires. The spheres are 50 nm diameter spaced by 75 nm in air/vacuum (refractive index, n ~1). Increased n results in increased damping, shift in resonance condition and decreased chain-coupling strength. The group velocities of the LPPs are $\sim 3 \times 10^7$ m/s for the Transverse (T) mode and $\sim 6 \times 10^7$ m/s for the longitudinal (L) mode; about two orders of magnitude higher velocities than found for electrons in semiconductors.

The propagation loss for LPPs moving along a chain array of such spheres is ~3 dB/500 nm.

The LPP excitation wavelength is ~670 nm, in the red, such as would be appropriate for Group III-Phosphide semiconductor laser materials. Compact femto-second laser-diode-based photon sources have been demonstrated which could provide numerous phase delayed LPP-inputs with the required powers and ~100 femto-second pulse-lengths (from quantum-dots) [see Brown, C. T. A., et al., (2004) 'Compact laser-diode-based femto-second sources' New J. Phys., 6, 175.].

Spheroidal (ellipsoidal) gold nano-particles can be placed closer together than spheres of the same volume. The group velocity of the modes is thereby increased to ~0.3 c and the propagation loss is reduced to less than 6 dB/micron.

Further shape change of the nano-particles to gold-nano-rods of the same volume, only when transverse LPP modes are coupled, reduces the attenuation to ~1.5 dB/micron.

Fabrication of such nano-particle shapes may be performed using electron-beam lithography and plasma-enhanced chemical vapor deposition techniques, for example. Use of standard nano-imprinting technology enables a scaling-up of such features to multiple LPP-based logic-gates covering very large areas, if needed.

The launching of an LPP into an LPP chain-logic gate can occur by using, for example, an embedded quantum-dot or quantum-wire emission, or alternatively, remotely by using (~100 femto-second time-delay-adjusted laser-pulses) photons arranged to exit the tip of a Scanning Near Field Microscope (SNOM) tip placed immediately adjacent to the intended light input particle in the chain of particles used to construct the logic gate intended for use. In either case, the required pulse energies will be around a few femto-Joules, for sufficient excitation of the LPP. In the quantum computing scenario, the input qubit is placed into the LPP chain logic in the same manner.

Figure 11:
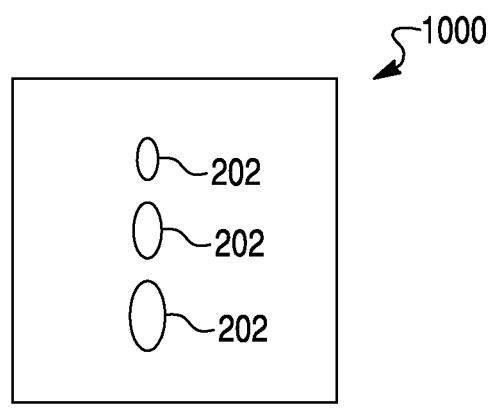
FIG. 11 is a schematic of an energy dump structure, according to an embodiment of the invention.

The longest chain dimensions necessary to create the flip flop described in FIG. 7 and FIG. 8 are ~30 nano-particle spacings (~10% less for a dual AND structure). For the example, using 75 nm nano-particle spacing, the chain length is 30×75=2250 nm. Using the propagation velocity of 0.3 c, a worst case propagation delay is calculated of $2.5 \times 10^{-14}$ seconds, or 25 femto-seconds. This is acceptable within a system both pumped and switching in ~100 femto-seconds, if correctly time delay phased. The necessary cross connected field-strengths can be present in the two NAND gates where needed at the moments that calculations occur.

Where NOT operations occur, energy will be reflected back into the chain, and this must be taken out and dumped. To achieve this, chain nano-particles of decreasing size are attached, so that the LPP is forced to decay radiatively as light and not heat, to provide an energy dump. As the chain diameter is decreased, so energy is leaked from the polariton as photons. This energy dump structure 1000 is shown in FIG. 11, where the size of the nano-particles 202 progressively decreases.

Figure 12:
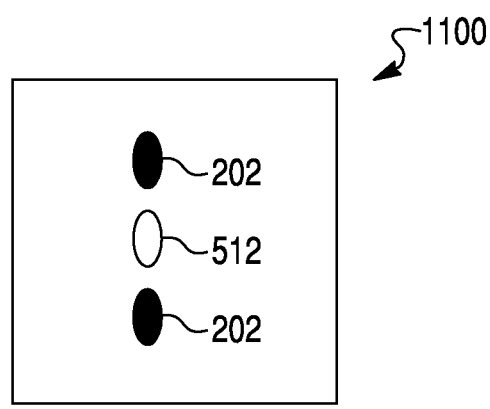
FIG. 12 is a schematic of an amplification structure, according to an embodiment of the invention.

When 90 degree turns or T-splitting/branching/fan-out operations occur, the LPP energy is reduced typically by 50%, and this should be restored to full strength as soon as possible. The required gain may be implemented by including in the chain of nano-particles the next available single nano-particle, which can be used for the location of a gain nano-particle, such as in the form of a suitably-sized, pumped quantum-dot. This structure is shown in amplification structure 1100 in FIG. 12, where the center nano-particle 512 between nano-particles 202 is the gain nano-particle. The gain nano-particle may be a quantum dot or a quantum wire, for example. Quantum-dots can also behave as plasmon-polaritons when sufficiently highly doped [Luther, J. M. et al, (2011) 'Localized surface plasmon resonances arising from free carriers in doped quantum dots', Nature Materials, 10, 361].

The flip flop switching speed is determined by how fast a nano-particle and NAND gate can switch. For nano-particles this might be as short as a few femto-seconds in theory, but for practical purposes this might be slowed down in reality by a factor 10×. This is also consistent with internal propagation delay reality.

Miller Criteria for Computing Competitiveness

The computing potential of the LPP scheme set out above may be quantified using the Miller criteria [Miller, D. A. B., (2010) 'Are optical transistors the logical next step?', Nat. Photon., 4, 3.]. Below is provided the Miller test criteria, with the potential of the LLP scheme for each criteria.

| Miller test | Chain LPP-computing potential |
| --- | --- |
| Cascadability | Yes - when in-chain LPP-gain is implemented. |
| Fan-out | Yes - when in-chain LPP-gain is implemented, and with careful attention to $d^{-3}$ cross-talk, i.e., adequate nano-particle spacing to avoid interference effects. [d = inter-nano-particle distance] |
| Switching energy (tens of atto-Joules) | Nearly - femto-Joules are calculated here. This might be reduced to the single-photon level, far smaller than atto-Joules. |
| Switching speed ~100 fs | Yes - 100 femto-second or less switching speeds are achievable. |
| Logic level restoration | Yes - gain can be incorporated in a single nano-particle in a chain LPP propagation. |
| I/O isolation | Yes - by taking reflections away to a beam-dump, through using orthogonal modes - or by tapering a chain-waveguide to lose energy as incoherent photons instead of local heat. |
| Absence of critical biasing | Yes - The input level is defined by a quantum-dot strength - or a pulse delivered by a SNOM light-waveguide tip. In-chain gain restores this value when required. |
| Logic level independent of loss | Yes - in-chain gain allows achieve of this criteria. |

While the example above describes LPPs using metal nano-particles (~$2.10^{22}$ free-carriers $cm^{-3}$), it is possible to create LPPs using free carriers in heavily doped quantum dots [Luther, J. M. et al, (2011) 'Localized surface plasmon resonances arising from free carriers in doped quantum dots', Nature Materials, 10, 361.]-(~$2.10^{18}$ to $10^{22}$ free-carriers $cm^{-3}$).

The examples above provide mixed spheroidal, spherical and nano-rod shapes forming chains for LPP propagation. The particular pattern and shape to be used, however, will depend on the particular logic structure. The nano-particle shapes may include shapes including spheres, spheroids, ellipsoids, cylinders, cubes or stars, for example. The nano-particle may also have rectangular-cubic, spiral-twisted, or v-shaped shapes.

The LPP based scheme described above provides several advantages. Ultra-high speed switching logic elements (at 10 Terahertz or higher speed) and entire computers may be constructed. Such computers might operate four order-of-magnitude faster than today's fastest digital computers.

The same propagating LPP structures can be used for Quantum Computing (QC) universal logic-gate, specifically the controlled-NOT (CNOT function).

The competitiveness of the LPP-logic capabilities presented here to that of up coming nano-CMOS using the Miller criteria shows the LLP logic passes all the tests.

The invention claimed is:

1. A computing structure, comprising:
   at least one logic gate having an arrangement of nano-particles configured to propagate localized plasmon-polaritons (LPPs); and
   a supporting substrate material in which the nano-particles are embedded.

2. The computing structure of claim 1, wherein the at least one logic gate is configured to perform a combinatorial logic function.

3. The computing structure of claim 2, wherein the combinatorial logic function comprises one or more of an AND, OR, NAND, NOR, NOT or XOR logic function.

4. The computing structure of claim 1, wherein the at least one logic gate is configured to perform a sequential logic function.

5. The computing structure of claim 4, wherein the at least one logic gate comprises a flip-flop.

6. The computing structure of claim 1, wherein the at least one logic gate is configured to perform a controlled not (CNOT) logic function.

7. The computing structure of claim 6, wherein the at least one logic gate comprises four NAND gates.

8. The computing structure of claim 1, wherein the nano-particles comprise portions arranged in chains allowing propagation of the LPPs along the chains.

9. The computing structure of claim 8, where the portions arranged in chains include inter-connected, cross-connected or un-connected chains.

10. The computing structure of claim 8, where the portions arranged in chains include a portion with a progressively different size of nano-particles such that LPPs traveling along the portion are converted into photons, photoelectrons, or alternative polarization states.

11. The computing structure of claim 8, wherein a portion of the chains are arranged in a chain assembly comprising a linear or non-linear photonic junction between chains or a change in the direction of chains.

12. The computing structure of claim 11, wherein the chain assembly includes a T-junction where a propagating LPP splits into two LPPs.

13. The computing structure of claim 11, wherein the chain assembly includes a 90° change in direction where a propagating LPP changes its propagation direction by 90°.

14. The computing structure of claim 8, wherein at least one of the chains comprises a nano-particle which is a gain particle for amplifying an LPP propagating to the gain particle through supply of gain.

15. The computing structure of claim 14, the gain particle is a quantum dot or a quantum wire, or a particle receiving photo-injection to amplify the LPP.

16. The computing structure of claim 14, wherein the gain particle is arranged in a chain near the junction between chains or the change in the direction of chains.

17. The computing structure of claim 1, wherein the nano-particles comprise nano-particles with shapes including spheres, spheroids, ellipsoids, cylinders, cubes, stars, rectangular-cubic, spiral-twisted, or v-shapes.

18. The computing structure of claim 1,
   wherein the nano-particles comprise doped semiconductors or oxides with doping levels between $10^{18}$ and $10^{22}$ free-carriers $cm^{-3}$.

19. The computing structure of claim 1, where adjacent of the nano-particle sizes are spaced from each other by a spacing, the spacing being in the region between a characteristic dimension of 0.1 nm to 2000 nm.

20. The computing structure of claim 1, wherein the nano-particle arrangement comprises a cross-connection portion, where propagating LPPs may propagate orthogonally to each other with minimal mode-interference.

21. The computing structure of claim 1, wherein the supporting substrate material is a semiconductor material.

22. The computing structure of claim 21, wherein the semiconductor material is one of a IV semiconductor, a III-V semiconductor, or a II-VI semiconductor.

23. The computing structure of claim 1, where the nano-particles are arranged in chains to propagate a longitudinal or transverse mode of an LPP along the chain.

24. The computing structure of claim 1, further comprising a laser, an LED, a super luminescent diode, or a quantum confinement structure light source arranged to provide excitation light into one or more of the nano-particles to excite an LPP.

25. The computing structure of claim 24, where the light source is quantum confinement structure being one of a quantum dot, a quantum wire, or a quantum well.

26. The computing structure of claim 24, where the light source is embedded within a chain of the nano-particles propagating the LPP, or is disposed externally to the chain.

27. The computing structure of claim 24, where an excitation wavelength of the excitation light lies in the ultra-violet, visible or infra-red regions of the electromagnetic spectrum.

28. The computing structure of claim 24, where an excitation energy of the excitation light is 100 femto-Joules or less.

29. The computing structure of claim 1, further comprising:
an output providing a logic result;
a photon, photoelectron, or an electron detector arranged to detect the logic result.

30. The computing structure of claim 29, wherein the detector is embedded within a chain of the nano-particles, or provided external to the nano-particles.

31. The computing structure of claim 1, wherein the logic gate has a gate state and is configured to perform a logic function based on a desired logic output.

32. The computing structure of claim 1, wherein the nano-particles are arranged to execute logic functions at times less than or equal to 1000 femto-seconds ($10^{-12}$ seconds).

33. A computer comprising the computing structure of claim 1.

34. A computing structure, comprising:
at least one logic gate having an arrangement of nano-particles configured to propagate localized plasmon-polaritons (LPPs),
wherein the nano-particles are embedded within a matrix material, the nano-particles comprise at least one of a metal, a semiconductor, a doped oxide, a carbon nanotube, or graphene, and the matrix material comprises at least one of a Group IV, a Group II-VI, or a Group III-V semiconductor material.

35. The computing structure of claim 34, wherein the metal comprises gold or silver.

36. A computing structure, comprising:
at least one logic gate having an arrangement of nano-particles configured to propagate localized plasmon-polaritons (LPPs),
where the nano-particle sizes are in the region between a characteristic dimension of 0.1 nm to 2000 nm.

* * * * *